(12) United States Patent
Johnson et al.

(10) Patent No.: US 11,694,816 B2
(45) Date of Patent: Jul. 4, 2023

(54) SELF-POWERED IN-CORE DETECTOR ARRANGEMENT FOR MEASURING FLUX IN A NUCLEAR REACTOR CORE

(71) Applicant: Framatome Inc., Lynchburg, VA (US)

(72) Inventors: Ian Mckeag Johnson, Forest, VA (US); Wesley Stults, Forest, VA (US); David Roberts, Lynchburg, VA (US)

(73) Assignee: Framatome Inc., Lynchburg, VA (US)

( * ) Notice: Subject to any disclaimer, the term of this patent is extended or adjusted under 35 U.S.C. 154(b) by 904 days.

(21) Appl. No.: 16/149,609

(22) Filed: Oct. 2, 2018

(65) Prior Publication Data
US 2020/0105426 A1    Apr. 2, 2020

(51) Int. Cl.
*G21C 17/108* (2006.01)
*G01T 3/00* (2006.01)
*G21D 3/00* (2006.01)

(52) U.S. Cl.
CPC ............ *G21C 17/108* (2013.01); *G01T 3/006* (2013.01); *G21D 3/001* (2013.01)

(58) Field of Classification Search
CPC .... G21C 17/10; G21C 17/102; G21C 17/104; G21C 17/108; G01T 3/006
See application file for complete search history.

(56) References Cited

U.S. PATENT DOCUMENTS 3,400,289 A    9/1968 Andersson
3,603,793 A *  9/1971 Warren ................... G01T 3/006
                                                   376/153

(Continued)

FOREIGN PATENT DOCUMENTS

CN    107767974 A     3/2018
DE       2532573 A1 *  1/1977  ............ G01T 3/006

(Continued)

OTHER PUBLICATIONS

Corresponding Search Report and Written Opinion for PCT/US2019/054193.

*Primary Examiner* — Sharon M Davis
(74) *Attorney, Agent, or Firm* — Davidson, Davidson & Kappel, LLC (57) ABSTRACT

A self-powered in-core detector arrangement for measuring flux in a nuclear reactor core includes a first in-core detector and a second in-core detector. The first in-core detector includes a first flux detecting material, a first lead wire extending longitudinally from a first axial end of the first flux detecting material, a first insulating material surrounding outer diameters of the first flux detecting material and the first lead wire and a first sheath surrounding the first insulating material. The first sheath includes a first section surrounding the first flux detecting material and a second section surrounding the first lead wire. The first section of the first sheath has a greater outer diameter than the second section of the first sheath. The second in-core detector includes a second flux detecting material, a second lead wire extending longitudinally from a first axial end of the second flux detecting material, a second insulating material surrounding outer diameters of the second flux detecting material and the second lead wire, and a second sheath surrounding the second insulating material. The second sheath includes a first section surrounding the second flux detecting material and a second section surrounding the second lead wire. The first section of the second sheath has a greater outer diameter than the second section of the second sheath. The first section of the first sheath is axially offset from the first section of the second sheath and radially aligned with the second section of second sheath.

12 Claims, 10 Drawing Sheets

(56) References Cited

U.S. PATENT DOCUMENTS

| | | | |
|---|---|---|---|
| 3,940,627 A | 2/1976 | Klar | |
| 4,123,658 A | 10/1978 | Johansson | |
| 4,140,910 A * | 2/1979 | Kroon | G01T 3/006 |
| | | | 250/390.01 |
| 4,237,380 A | 12/1980 | Playfoot et al. | |
| 4,267,454 A | 5/1981 | Playfoot et al. | |
| 4,284,893 A | 8/1981 | Allan et al. | |
| 4,288,291 A * | 9/1981 | Cisco | G21C 17/108 |
| | | | 376/153 |
| 4,363,970 A | 12/1982 | Allan et al. | |
| 4,623,508 A * | 11/1986 | Glesius | H01J 47/1233 |
| | | | 376/254 |
| 6,744,840 B2 * | 6/2004 | Karino | G21C 17/108 |
| | | | 376/254 |
| 2011/0293058 A1 | 12/2011 | Pfeiffer | |

FOREIGN PATENT DOCUMENTS

| | | | |
|---|---|---|---|
| DE | 2914508 A1 | 10/1979 | |
| EP | 0403223 A2 | 12/1990 | |
| RU | 2178211 C2 | 1/2002 | |
| WO | WO-9811560 A1 * | 3/1998 | G21C 17/108 |

\* cited by examiner

SELF-POWERED IN-CORE DETECTOR ARRANGEMENT FOR MEASURING FLUX IN A NUCLEAR REACTOR CORE

The present disclosure relates generally to nuclear reactor cores and more specifically to detectors for measuring flux in nuclear reactor cores.

BACKGROUND

Inside nuclear reactors, local power is measured with in-core detectors designed to operate and survive in the environment. The in-core detectors include self-powered neutron detectors (SPNDs) or self-powered detectors (SPDs). A short section of detector material, lead-wire and crushable ceramic insulators are assembled inside a long thin metal housing. The metal housing is formed of Inconel or stainless steel tubes and is called a sheath. The sheath outer diameter is reduced multiple times crushing the ceramic insulators around the detector material and lead-wire to insulate it from the sheath producing a continuous length SPND or SPD. The detector material within the sheath is aligned within a specific location of the core when inserted. The lead-wire is connected to the bottom of the short section of detector material and extends along the full length of the sheath to carry the electrical signal from the detector material to a connector so it can be transmitted for plant use.

A section of the lead-wire of the sheathed detector is inserted into the reactor and both the short section of detector material and the lead-wire interact with the radiation in the reactor. The lead-wire section that only contains the sheath, wire, and ceramic interacts through many different radiation processes that cause electrons to be ejected and freed which can flow through the wire and cause what is called a background signal on the wire. Since this background signal does not originate from interactions in the detector material then it causes a background error on the signal because the signal no longer only represents what it being produced at the detector material.

Conventionally, four main methods have been used to remove the background error. The first method is to include a background wire inside the sheath that extends the full length inside the sheath and ceramic insulator, and that does not touch the detector wire. The background wire is not connected to the detector material and is often called a background or compensation wire. When nuclear power plant systems read the signal from the detector wire, they can also read the signal from the background wire and then mathematically compensate the detector wire signal from the background wire signal through various techniques. This arrangement is often called a twin lead detector.

The second method is similar to the first method, except instead of putting two wires in the same sheath, another component is built with the long wire with crushed ceramic and a sheath around it of the same or similar length without including detector material. The plant can measure and compensate in a similar manner as the first method with various techniques. The second method is said to involve a single lead detector and a background detector.

The third method involves connecting another wire known as a tail wire to an end of the detector material opposite of the lead detector wire. The tail wire also has ceramic crushed around it and is included in a sheath, but the tail wire is fully enclosed in ceramic. This detector arrangement is known as a single lead with tails and it is also used with a background detector.

The fourth method is to a detector with the detector material as long as needed so that any part of the sheathed component inside the core is all detector material and the wire carrying the signal is only connected inside the sheath and ceramic beyond the part of the component not inside the core. This essentially allows only the signal from the detector material to be producing radiation induced signals because the region with the wire only is not inside the core, but requires more sheathed elements of varying lengths so that they can compensate each other and measure specific portions of the core.

SUMMARY OF THE INVENTION

A self-powered in-core detector arrangement for measuring flux in a nuclear reactor core includes a first in-core detector and a second in-core detector. The first in-core detector includes a first flux detecting material, a first lead wire extending longitudinally from a first axial end of the first flux detecting material, a first insulating material surrounding outer diameters of the first flux detecting material and the first lead wire and a first sheath surrounding the first insulating material. The first sheath includes a first section surrounding the first flux detecting material and a second section surrounding the first lead wire. The first section of the first sheath has a greater outer diameter than the second section of the first sheath. The second in-core detector includes a second flux detecting material, a second lead wire extending longitudinally from a first axial end of the second flux detecting material, a second insulating material surrounding outer diameters of the second flux detecting material and the second lead wire, and a second sheath surrounding the second insulating material. The second sheath includes a first section surrounding the second flux detecting material and a second section surrounding the second lead wire. The first section of the second sheath has a greater outer diameter than the second section of the second sheath. The first section of the first sheath is axially offset from the first section of the second sheath and radially aligned with the second section of second sheath.

A method of arranging self-powered in-core detectors for measuring flux in a nuclear reactor core is also provided. The method includes providing a first in-core detector and providing a second in-core detector. The first in-core detector includes a first flux detecting material, a first lead wire extending longitudinally from a first axial end of the first flux detecting material, a first insulating material surrounding outer diameters of the first flux detecting material and the first lead wire and a first sheath surrounding the first insulating material. The first sheath includes a first section surrounding the first flux detecting material and a second section surrounding the first lead wire. The first section of the first sheath has a greater outer diameter than the second section of the first sheath. The second in-core detector includes a second flux detecting material, a second lead wire extending longitudinally from a first axial end of the second flux detecting material, a second insulating material surrounding outer diameters of the second flux detecting material and the second lead wire, and a second sheath surrounding the second insulating material. The second sheath includes a first section surrounding the second flux detecting material and a second section surrounding the second lead wire. The first section of the second sheath has a greater outer diameter than the second section of the second sheath. The method also includes arranging the first in-core detector and the second in-core detector in the reactor core such that the first section of the first sheath is axially offset from the first section of the second sheath and radially aligned with the second section of second sheath.

BRIEF DESCRIPTION OF THE DRAWINGS

The present invention is described below by reference to the following drawings, in which.

DETAILED DESCRIPTION

The present disclosure provides SPNDs or SPDs configured such that the background signal is a function of the amount of material in the physical space where the wire is leaving the detector material and is traveling inside the reactor to the outside connector. The volume and mass of the sheath, ceramic, and wire in this region all are proportional to the amount of background signal. To significantly reduce the background signal, a tapered design for the sheath is provided to significantly reduce the background signal by reducing the volume and mass of the sheath and the ceramic so that a much smaller fraction of material is available for radiation interactions, causing a proportional reduction in background signal that needs to be compensated. A plurality of SPNDs or SPDs having tapered sheaths are then arranged together in a space saving arrangement in which the detector material of adjacent SPNDs or SPDs are axially offset from each other and aligned with a reduced width background section. The tapered design can open up more space in an overall assembly that includes many sheathed elements to either reduce the overall assembly diameter or allow more sheathed elements to be included in the same diameter where fewer would fit before.

Figure 1:
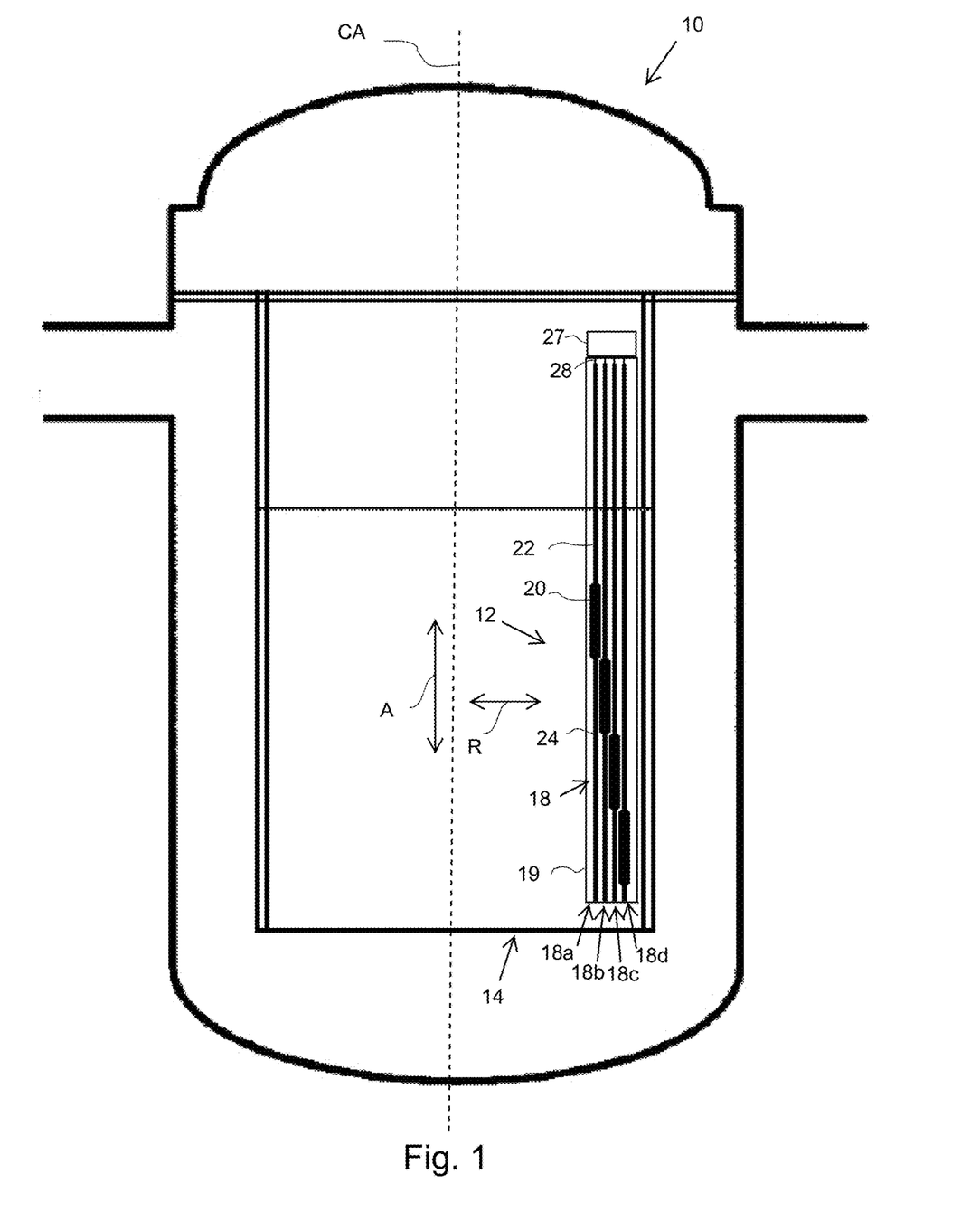
FIG. 1 schematically shows a nuclear reactor pressure vessel including a self-powered in-core detector arrangement provided in a reactor core in accordance with an embodiment of the present invention.

FIG. 1 schematically shows a nuclear reactor pressure vessel 10 including a self-powered in-core detector arrangement 12 provided in a reactor core 14 of pressure vessel 10 to measure local power in reactor core 14. Pressure vessel 10 is centered on a vertically extending center axis CA. Unless otherwise mentioned, the terms axial, radial and circumferential and derivatives thereof are used in reference to center axis CA, with radial direction R and axial direction A being shown in FIG. 1. Detector arrangement 12 includes a plurality of detectors 18 in the form of SPNDs or SPDs arranged inside of a housing in the form of an oversheath 19 that surrounds detectors 18. Each detector 18 includes a first section 20, a second section 22 protruding from enlarged section 20 in a first axial direction and a third section 24 protruding from enlarged section 20 in a second axial direction that is opposite of the first axial direction. First section 20 has a larger outer diameter than sections 22, 24 and is a radially thickest portion of the respective detector 18. Sections 22, 24 have a same outer diameter. Second section 22 is vertically above first section 20 in reactor core 14 and third section 24 is vertically below first section 20 in reactor core 14.

As shown in FIG. 1, detectors 18 are arranged and configured such that first sections 20 of directly radially adjacent detectors 18 are axially offset from each other. This axial offset allows more detectors 18 to be placed into a volume of reactor core 14 defined by oversheath 19, for space optimization. In the example shown in FIG. 1, four detectors 18 denoted as detectors 18a, 18b, 18c, 18d are shown; however, it should be understood that reactor 14 may include more than two detectors 18, with a typical range being four to seven axial detectors. Detectors 18a, 18b, 18c, 18d includes first sections 20 that are axially offset from each other. Detectors 18 are arranged such that the outer circumferential surface of the first section 20 of each detectors 18 extends radially past an outer circumferential surface of first section 20 of at least one directly radially adjacent detector 18 to create radial overlap, which is discussed further with respect to FIGS. 4, 6a, 6b.

More specifically, referring to detectors 18a, 18b, 18c, 18d, the outer circumferential surface of first section 20 of the detector 18a extends radially past an outer circumferential surface of first section 20 of the directly radially adjacent detector 18b such that first section 20 of the detector 18a radially overlaps first section 20 of detector 18b. Additionally, the outer circumferential surface of first section 20 of the detector 18b extends radially past the outer circumferential surfaces of the first sections 20 of both of the directly radially adjacent detector 18a, 18c such that first section 20 of the detector 18b radially overlaps first section 20 of detectors 18a, 18c. Similarly, the outer circumferential surface of first section 20 of the detector 18c extends radially past the outer circumferential surfaces of the first sections 20 of both of the directly radially adjacent detector 18b, 18d such that first section 20 of the detector 18c radially overlaps first section 20 of detectors 18b, 18d; and the outer circumferential surface of first section 20 of the detector 18d extends radially past an outer circumferential surface of first section 20 of the directly radially adjacent detector 18c such that first section 20 of the detector 18d radially overlaps first section 20 of detector 18c.

This arrangement causes the outer circumferential surface of the respective first section 20 of each detector 18 to be radially offset further from the outer circumferential surfaces of the second and third sections 22, 24 of the respective detector 18 than from the outer circumferential surfaces of the second and third sections 22, 24 of at least one directly radially adjacent detector 18.

More specifically, referring to detectors 18a, 18b, 18c, 18d, the outer circumferential surface of the first section 20 of detector 18a is radially offset further from the outer circumferential surfaces of the second and third sections 22, 24 of detector 18a than from the outer circumferential surfaces of the second and third sections 22, 24 of the directly radially adjacent detector 18b. Additionally, the outer circumferential surface of the first section 20 of detector 18b is radially offset further from the outer circumferential surfaces of the second and third sections 22, 24 of detector 18b than from the outer circumferential surfaces of the second and third sections 22, 24 of both of the directly radially adjacent detector 18a, 18c. Similarly, the outer circumferential surface of the first section 20 of detector 18c is radially offset further from the outer circumferential surfaces of the second and third sections 22, 24 of detector 18c than from the outer circumferential surfaces of the second and third sections 22, 24 of both of the directly radially adjacent detector 18b, 18d; and the outer circumferential surface of the first section 20 of detector 18d is radially offset further from the outer circumferential surfaces of the second and third sections 22, 24 of detector 18d than from the outer circumferential surfaces of the second and third sections 22, 24 of the directly radially adjacent detector 18c.

Figure 2:
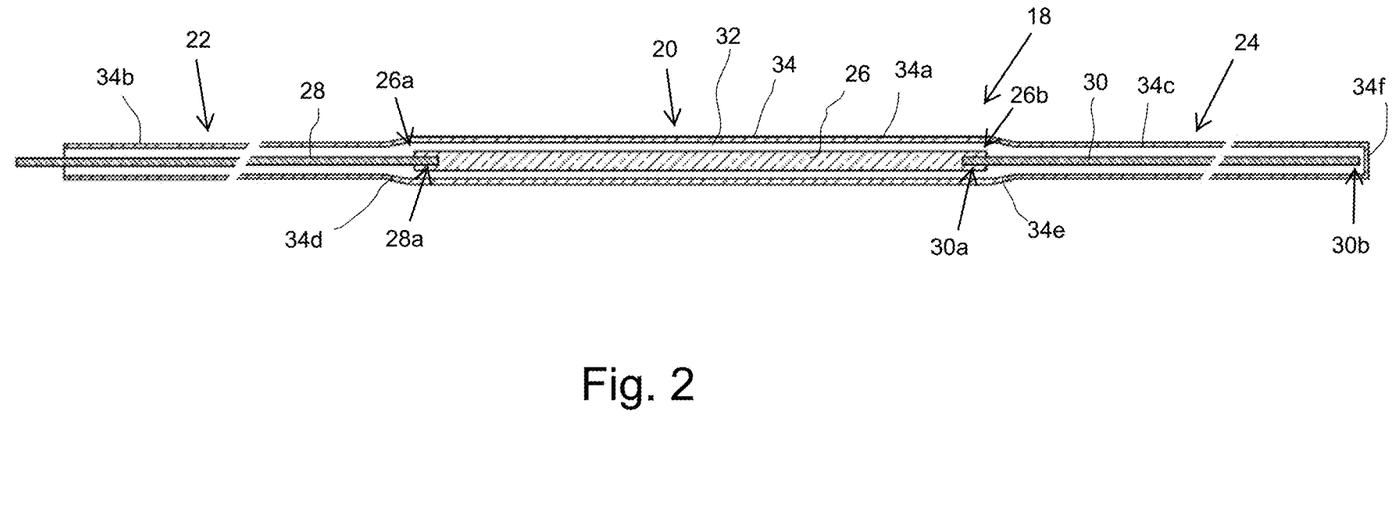
FIG. 2 shows a detailed view of one of SPNDs or SPDs shown in FIG. 1.

FIG. 2 shows a detailed view of one of detectors 18. As shown in FIG. 2, detector 18 includes a contiguous section of a flux detecting material 26, a lead wire 28 extending from a first axial end 26a of detector material 26 and a tail wire 30 extending from a second axial end 26b of detector material 26. A first axial end 28a of lead wire 28 is embedded in first axial end 26a of detector material 26 and a first axial end 30a of tail wire 30 is embedded in second axial end 26b of detector material 26. Detector material 26, tail wire 30 and a portion of lead wire 28 are directly surrounded by an insulator 32 in the radial direction. Insulator 32 also surrounds a second axial end 30b of tail wire 30 in the axial direction. Insulator 32 is directly surrounded by a sheath 34 in the radial direction and in the axial direction at the second axial end 30b of tail wire 30. In other embodiments, instead of section 24 including a tail wire, section 24 may have no wire and only be a solid or filled section just to maintain geometry.

Detector material 26 is a conducting or semiconducting material that emits electrons as a result of neutron and gamma irradiation, and may be formed example rhodium, platinum, vanadium, aluminum, silver, cadmium, gadolinium, cobalt, hafnium or scandium. Detector material 26 is shaped as a cylindrical rod. Insulator 32 is electrically insulating and may be formed of ceramic material, for example crushed ceramic alumina or magnesia material. Wires 28, 30 are formed of electrically conductive material and lead wire 28 conveys the signal emitted by detector material 26 to a computer configured to determine the local power in reactor core 14 based on the signals conveyed by lead wire 28. More specifically, as shown in FIG. 1, the electrical signals output by detectors 18 in response to the flux in the reactor core are output via from a connector 27 of assembly 12, which is configured to be inserted into a connector of the power plant. The power plant connector then sends the signals through wires to a power plant computer configured for determining the local power in reactor core 14 based on the signals from detectors 18 for display on a graphical user interface of computer for review by a user for operating core 14

Detector material 26 is provided solely in first section 20, while a majority of lead wire 28 is provided in second section 22 and a majority of tail wire 30 is provided in third section 24. Insulator 32 and sheath 34 extend through all of sections 20, 22, 24, with sheath 34 defining outer circumferential surfaces of sections 20, 22, 24. Accordingly, an outer circumferential surface of sheath 34 has larger outer diameter at first section 20, than at second section 22 and at third section 24. More specifically, sheath 34 includes a first sheath section 34a that is cylindrical and defines the outer circumferential surface of first section 20, a second sheath section 34b that is cylindrical and defines the outer circumferential surface of second section 22 and a third sheath section 34c that is cylindrical and defines the outer circumferential surface of third section 24. Sheath 34 also includes a first tapered section 34d extending radially outward while extending axially from second section 34b to first section 34a, and a second tapered section 34e extending radially outward while extending axially from third section 34c to first section 34a. Sheath 34 further includes an end section 34f axially abutting the portion of insulator 32 that contacts second end 30b of tail wire 30. End section 34e defines a closed end of sheath 34. An axial end of second section 34b that is axially furthest from detector material 26 defines an open end of sheath 34. Lead wire 28 extends out through the open end of sheath 34 outside of the reactor core 14. As shown in FIG. 1, oversheath 19 extends far outside the reactor core 14 to connector 27, and lead wire 28 extends out of sheath 34 inside the oversheath 19 just before lead wire 28 reaches connector 27.

Referring to FIGS. 1 and 2 together, it should be noted that FIG. 1 shows an embodiment where detector assembly 12 is mounted through the reactor head, and thus each section 22, which includes the lead wire 28, is above the respective section 20, which includes the detector material 26, and each section 24, which includes the tail wire 30, is below the respective section 20. In other embodiments, detector assembly 12 is mounted through the bottom of the reactor, so each section 22, which includes the lead wire 28, is below the respective section 20, which includes the detector material 26, and each section 24, which includes the tail wire 30, is above the respective section 20.

Figure 3:
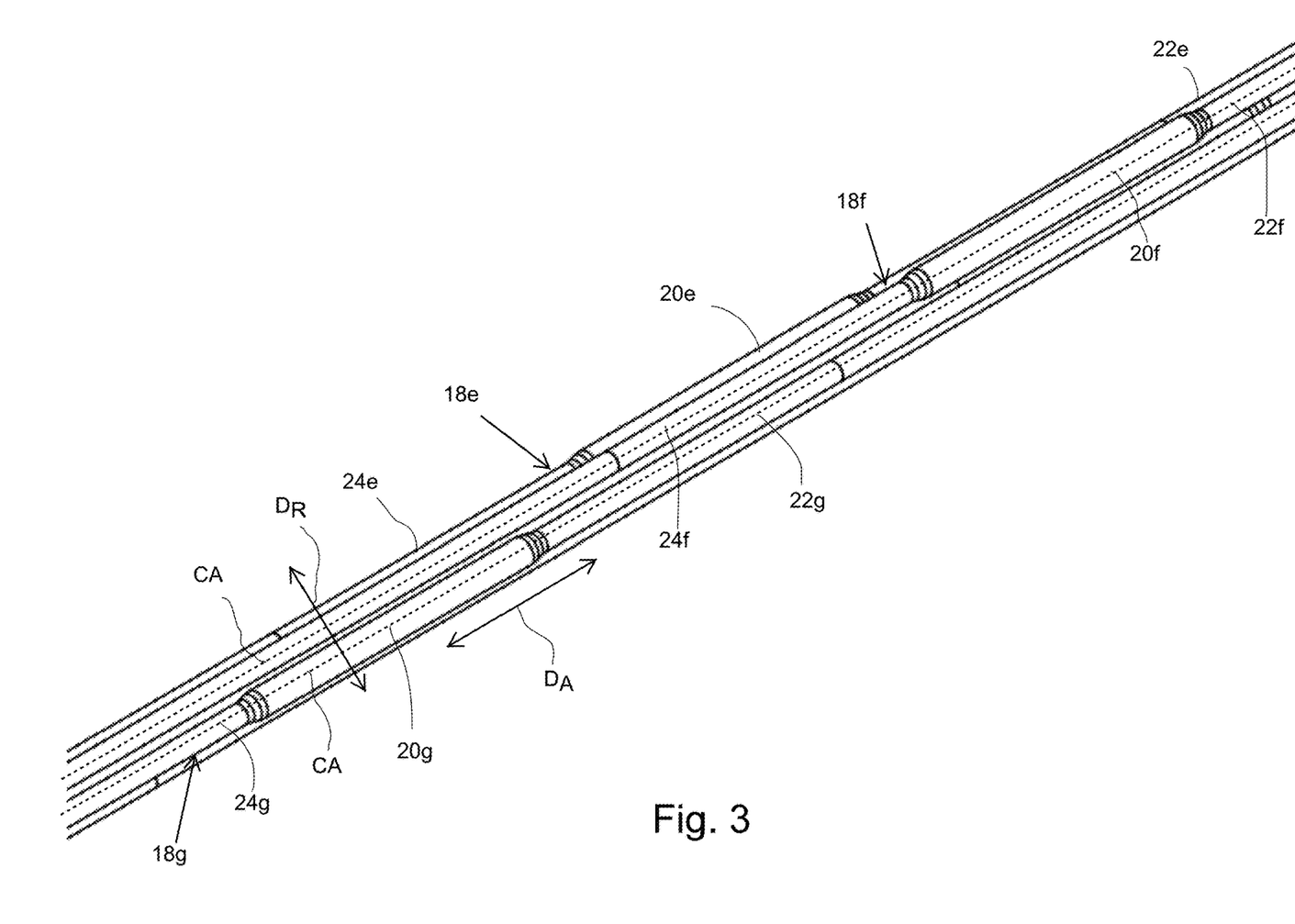
FIG. 3 illustrates an arrangement of three SPNDs or SPDs in accordance with an embodiment of the present invention.

FIG. 3 illustrates an arrangement of three detectors 18 in accordance with an embodiment of the present invention. As mentioned above with respect to FIG. 1, the detectors 18 would be arranged inside of an oversheath 19, but the oversheath has been omitted in FIG. 3 for clarity. The three detectors 18 are denoted as detectors 18e, 18f, 18g, with detector 18e including three sections 20e, 22e, 24e, detector 18f including three sections 20f, 22f, 24f and detector 18g including three sections 20g, 22g, 24g. Detectors 18e, 18f, 18g are nestled together in a compact arrangement. Detectors 18e, 18f, 18g are arranged in a bundled arrangement, with longitudinal center axes CA of detectors 18e, 18f, 18g defining vertices of a polygon, which is a triangle when three detectors 18 are used, in a plane perpendicular to the center axes CA of detectors 18e, 18f, 18g. The terms axial and radial, and derivatives thereof, are used throughout the present disclosure in reference to center axes CA, which extend parallel to one another and thus consistently designate a radial direction $D_R$ and an axial direction $D_A$. As shown in FIG. 3, the radial direction $D_R$ extends perpendicular to center axes CA and the axial direction $D_A$ extends parallel to center axes CA.

The first section 20f of detector 18f is radially aligned with a portion of second section 22e of detector 18e and radially aligned with a portion of second section 22g of detector 18g. By radially aligned, it is meant that in the radial direction $D_R$, first section 20f of detector 18f is aligned with a portion of second section 22e of detector 18e, and in the radial direction $D_R$, first section 20f of detector 18f is aligned with a portion of second section 22g of detector 18g. In other words, a plane extending perpendicular to center axis CA of detector 18f anywhere in first section 20f would intersect second section 22e of detector 18e second section 22g of detector 18g. A first portion of the outer circumferential surface of first section 20f directly radially faces a portion of the outer circumferential surface of second section 22e and a second portion of the outer circumferential surface of first section 20f directly radially faces a portion of the outer circumferential surface of second section 22g. By directly radially faces, it is meant that there is no intervening object radially between these sections.

The first section 20e of detector 18e is radially aligned with a portion of third section 24f of detector 18f and radially aligned with a portion of second section 22g of detector 18g. A portion of the outer circumferential surface of first section 20e directly radially faces a portion of the outer circumferential surface of third section 24f.

The first section 20g of detector 18g is radially aligned with a portion of third section 24f of detector 18f and radially aligned with a portion of third section 24e of detector 18e. A portion of the outer circumferential surface of first section 20g directly radially faces a portion of the outer circumferential surface of third section 24f.

Figure 4:
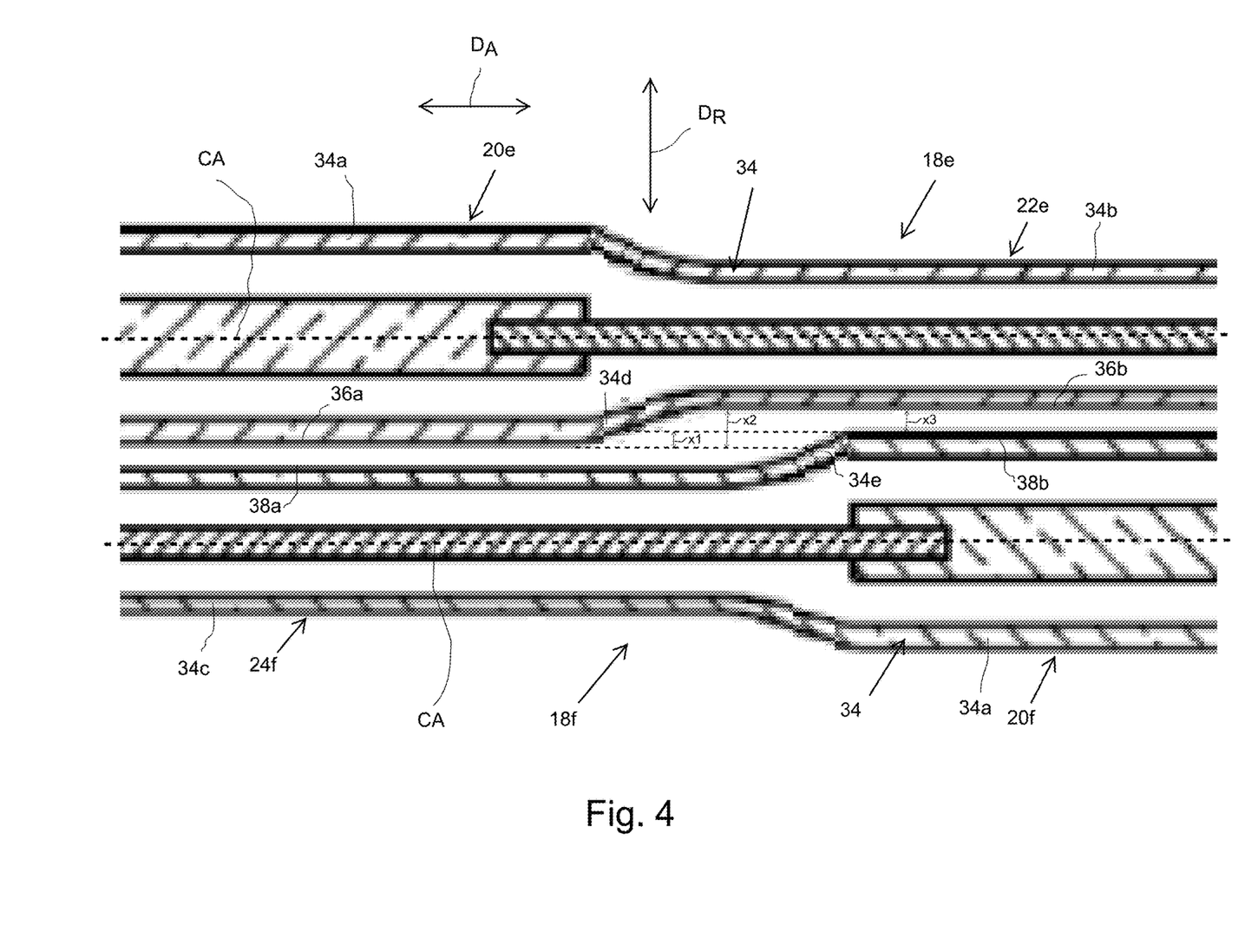
FIG. 4 shows a radial cross-sectional view of portions of two of the SPNDs or SPDs shown in FIG. 3.

FIG. 4 shows a radial cross-sectional view of portions of detectors 18e and 18f. As discussed with respect to FIG. 3, first section 20f of detector 18f is radially aligned with a portion of second section 22e of detector 18e such that a portion of the outer circumferential surface of first section 20f is directly radially facing a portion of the outer circumferential surface of second section 22e. Also, first section 20e of detector 18e is radially aligned with a portion of third section 24f of detector 18f such that a portion of the outer circumferential surface of first section 20e is directly radially facing a portion of the outer circumferential surface of third section 24f.

More specifically, an outer circumferential surface 36a of sheath section 34a of detector 18e is radially aligned with and directly radially facing an outer circumferential surface 38a of sheath section 34c of detector 18f; and an outer circumferential surface 36b of sheath section 34b of detector 18e is radially aligned with and directly radially facing an outer circumferential surface 38b of sheath section 34a of detector 18f.

As similarly noted above with respect to FIG. 1, detector 18e, 18f are arranged such that the outer circumferential surface 36a of the sheath section 34a of detector 18e extends radially past the outer circumferential surface 38b of sheath section 34a of detector 18f to create a radial overlap by a distance x1. More specifically, the radial overlap is of tapered sheath sections 34d, 34e. As similarly discussed below with respect to FIG. 9, tapered sheath sections 34d, 34e may also axially overlap in some embodiments. The outer circumferential surface 36a of the sheath section 34a of detector 18e is radially offset from the outer circumferential surface 36b of sheath section 34b of detector 18e by a distance x2 and that is greater than a distance x3 that the outer circumferential surface 38b of sheath section 34a of detector 18f is radially offset from the outer circumferential surface 36b of sheath section 34b of detector 18e. Accordingly, a portion of tapered sheath section 34d of detector 18e is directly axially aligned with a portion of tapered sheath section 34e of detector 18f. By axially aligned, it is meant that in the axial direction $D_A$, portion of tapered sheath section 34d of detector 18e is aligned with a portion of tapered sheath section 34e of detector 18f. In other words, a line extending parallel to center axis CA of detectors 18e, 18f in a portion of tapered sheath section 34d would intersect a portion of tapered sheath section 34e of detector 18f. In some embodiments, the detectors 18 may be in full contact with each other, and thus x3 is zero.

Figures 5A, 5B:
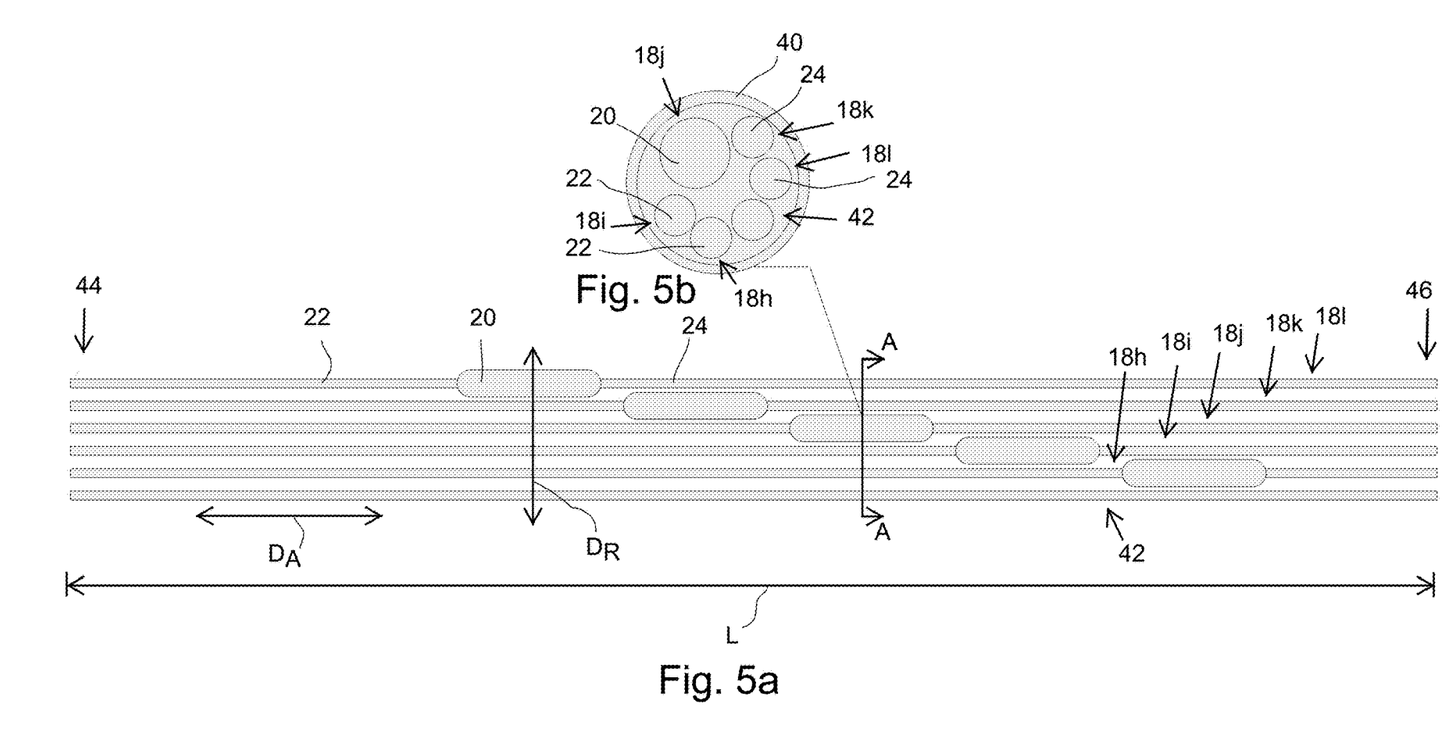
FIGS. 5a and 5b schematically show a self-powered in-core detector arrangement in accordance with another embodiment of the present invention including detectors with both lead and tail sections and a background detector.

FIGS. 5a and 5b schematically show a self-powered in-core detector arrangement in accordance with an embodiment of the present invention. The arrangement in FIGS. 5a and 5b includes five detectors 18 denoted as detectors 18h, 18i, 18j, 18k, 18l, with each detector 18 including three sections 20, 22, 24 arranged with sections 20 axially offset from each other such that detectors 18 are nestled together in a compact arrangement. FIG. 5a shows detectors 18h to 18l arranged in a linear arrangement so each detectors 18h to 18l is viewed clearly; however, as shown in FIG. 5b, which illustrates an axial cross-sectional view taken along A-A in FIG. 5a, detectors 18h to 18l are arranged in non-linear bundled arrangement inside a housing 40. In one preferred embodiment, housing 40 is formed as an outer sheath such as Inconel or stainless steel that is crushed around the set of detectors 18h to 18l to protect and hold detectors 18h to 18l in their planned spacing arrangement. In addition to detectors 18h to 18l, the arrangement also includes a background detector 42 that is configured is a similar manner to detectors 18 to 18l, except that background detector 42 does not include detector material. Background detector 42 thus does not include an enlarged region, and an entirety of background detector has a substantially constant outer diameter. Background detector 42 includes a single wire, insulation and an outer sheath arranged in the same manner as the background detectors 430a, 430b, 430c shown in FIG. 9.

Detectors 18h to 18l and 42 are arranged in bundled arrangement, with center axes of detectors 18h to 18l and 42 defining vertices of a polygon, which is a hexagon when six detectors are used, in a plane perpendicular to the center axes of detectors 18h to 18l and 42 (for example the plane A-A). Like the embodiments described above, sections 20 each include detector material, section 22 includes a lead wire and section 24 includes a tail wire. Each of detectors 18h to 18l and 42 includes a first end 44 that is configured to be arranged in the nuclear reactor closest to the top of the reactor core in the embodiment shown in FIG. 1 (and closest to the bottom of the reactor core in embodiments where the detector assembly 12 is mounted through the bottom of the reactor) and a second end 46 that is configured to be arranged in the nuclear reactor closest to the bottom of the reactor core in the embodiment shown in FIG. 1 (and closest to the top of the reactor core in embodiments where the detector assembly 12 is mounted through the bottom of the reactor). Each of detectors 18h to 18l and 42 is a same length L and each of detectors 18h to 18l has a different configuration than the other detectors 18h to 18l. More specifically, each of detectors 18h to 18l includes section 20 at a different axial location, such that detectors 18h to 18l all include sections 22 of different length than each other and sections 24 of different length than each other. In the embodiment shown in FIG. 5a, all of sections 20 are of the same length. Along these lines, detector 18l includes a section 22 that is shorter than the section 22 of each of the other detectors 18h to 18k and a section 24 that is longer than the section 24 of each of the other detectors 18h to 18k, while detector 18h includes a section 22 that is longer than the section 22 of the each of the other detectors 18i to 18l and a section 24 that is shorter than the section 24 of each of the other detectors 18i to 18l.

Like the detectors discussed above with respect to FIG. 4, detectors 18h to 18l are arranged such that first sections 20 include outer circumferential surfaces that extend radially past the outer circumferential surfaces of the first sections 20 of one or more of the directly adjacent detectors. For example, as shown in FIG. 5a, the outer circumferential surface of section 20 of detector 18j extends radially past the outer circumferential surfaces of the first sections 20 of directly adjacent detectors 18i and 18k such that first section 20 of the detector 18j radially overlaps first section 20 of detectors 18i, 18k. As can be understood by viewing FIGS. 5a and 5b together, the outer circumferential surface of section 20 of detector 18j may also extend radially past the outer circumferential surfaces of the first sections 20 of detectors 18h and 18l due to the compact non-linear bundled arrangement of detectors 18h to 18l, for an extremely compact arrangement.

Due to sections 20 of the detectors 18h to 18l being axially offset from each other, each of detectors 18h to 18l of FIGS. 5a, 5b includes a section 20 that is in radial alignment with one or more sections 22 and/or one or more sections 24 of the other detectors 18h to 18l. Section 20 of detector 18l is in radial alignment with sections 22 of all of the other detectors 18h to 18k. By radial alignment, as similar noted above, it is meant that in the radial direction $D_R$, first section 20 of detector 18l is in alignment with a portion of second section 22s of detectors 18h to 18k. In other words, a plane extending perpendicular to center axes CA of detectors 18h to 18l anywhere in first section 20 of detector 18l would intersect second section 22s of detectors 18h to 18k. Section 20 of detector 18k is in radial alignment with sections 22 of detectors 18h to 18j and the section 24 of detector 18l. Section 20 of detector 18j is in radial alignment with sections 22 of detectors 18h, 18i and the sections 24 of detectors 18l, 18k. Section 20 of detector 18i is in radial alignment with section 22 of detectors 18h and the sections 24 of detectors 18l to 18j. Section 20 of detector 18h is in radial alignment with sections 24 of all of the other detectors 18i to 18l.

Figures 6A, 6B, 6C:
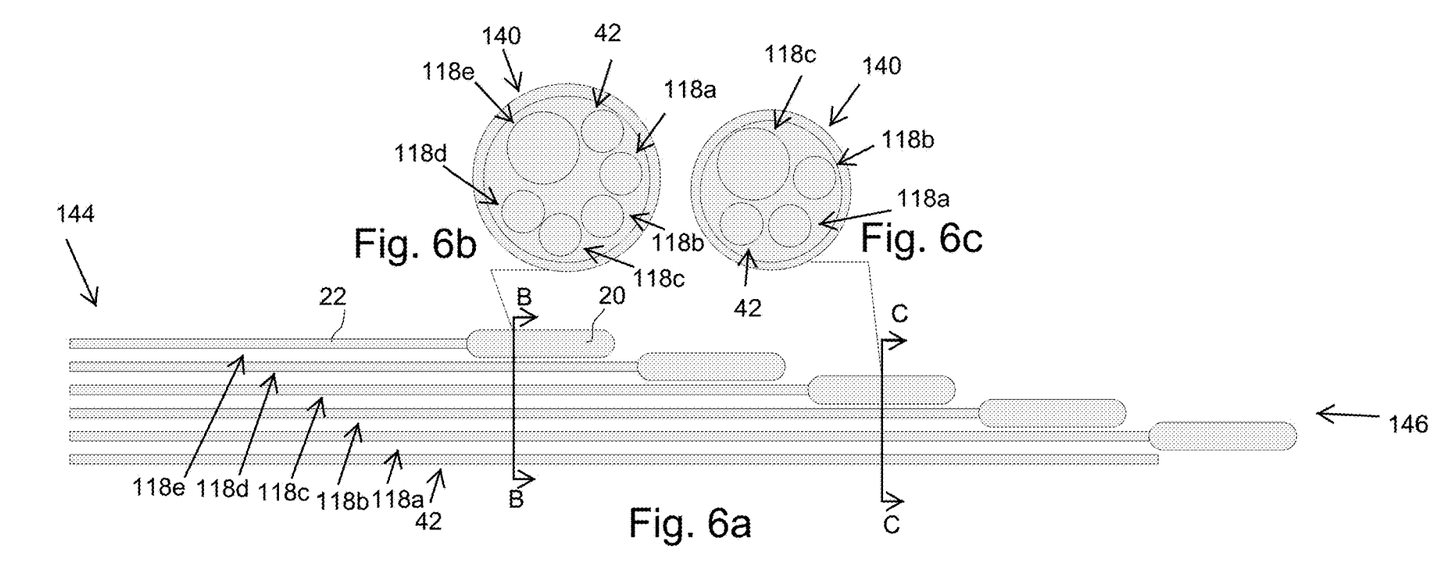
FIGS. 6a to 6c schematically show a self-powered in-core detector arrangement in accordance with another embodiment of the present invention including detectors with lead sections and a background detector.

FIGS. 6a to 6c schematically show a self-powered in-core detector arrangement in accordance with another embodiment of the present invention. The arrangement in FIGS. 6a to 6c includes five detectors 118 denoted as detectors 118a, 118b, 118c, 118d, 118e, with each detector 118 including only two sections 20, 22 (i.e., detectors 118a to 118e do not include tail wires or any type of tail section) arranged with sections 20 axially offset from each other such that detectors 18 are nestled together in a compact arrangement. FIG. 6a shows detectors 118a to 118e arranged in a linear arrangement so each detectors 118a to 118e is viewed clearly; however, as shown in FIG. 6b, which illustrates an axial cross-sectional view taken along B-B in FIG. 6a, and FIG. 6c, which illustrates an axial cross-sectional view taken along C-C in FIG. 6a, detectors 118a to 118e are arranged in non-linear bundled arrangement inside a housing 140. In one preferred embodiment, housing 140 is formed as an outer sheath such as Inconel or stainless steel that is crushed around the set of detectors 118a to 118e to protect and hold detectors 118a to 118e in their planned spacing arrangement. In addition to detectors 118a to 118e, the arrangement also includes a background detector 42 having a same length as the lead wire of the longest detector, i.e., detector 118a.

Detectors 118a to 118e and 42 are arranged in bundled arrangement, with center axes of detectors 118a to 118e and 42 defining vertices of a polygon, which is a hexagon when six detectors are used, in a plane perpendicular to the center axes of detectors 118a to 118e and 42 (for example the plane B-B). Like the embodiments described above, sections 20 each include detector material and sections 22 each includes a lead wire. Each of detectors 118a to 118e includes a first end 144 that is configured to be arranged in the nuclear reactor closest to the top of the reactor in the embodiment shown in FIG. 1 (and closest to the bottom of the reactor core in embodiments where the detector assembly 12 is mounted through the bottom of the reactor) and a second end 146 that is configured to be arranged in the nuclear reactor closest to the bottom of the reactor in the embodiment shown in FIG. 1 (and closest to the top of the reactor core in embodiments where the detector assembly 12 is mounted through the bottom of the reactor). Each of detectors 118a to 118e is of a different length and has a different configuration that the other detectors 118a to 118e. More specifically, each of detectors 118a to 118e includes section 20 at a different axial location, such that 118a to 118e all include sections 22 of different length than each other. In the embodiment shown in FIG. 6a, all of sections 20 are of the same length. Along these lines, detector 118e includes a section 22 that is shorter than the section 22 of each of the other detectors 118a to 118d, while detector 118a includes a section 22 that is longer than the section 22 of the each of the other detectors 118b to 118e.

Figure 6D:
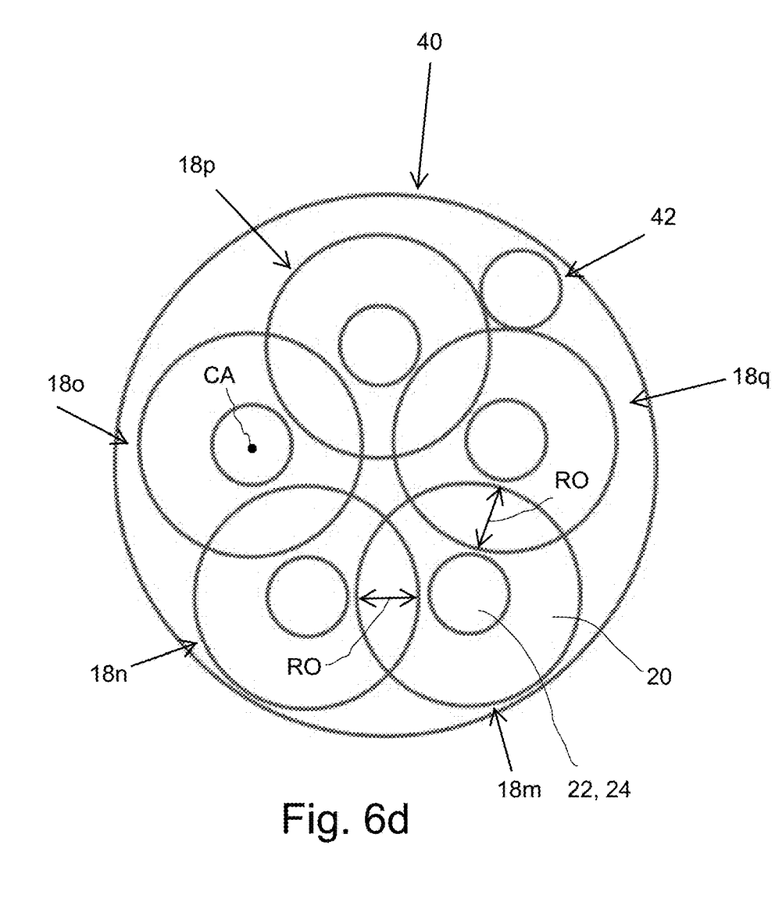
FIGS. 6d and 6e schematically show axial views that illustrate the radial overlap of detector material sections of detectors.
Figure 6E:
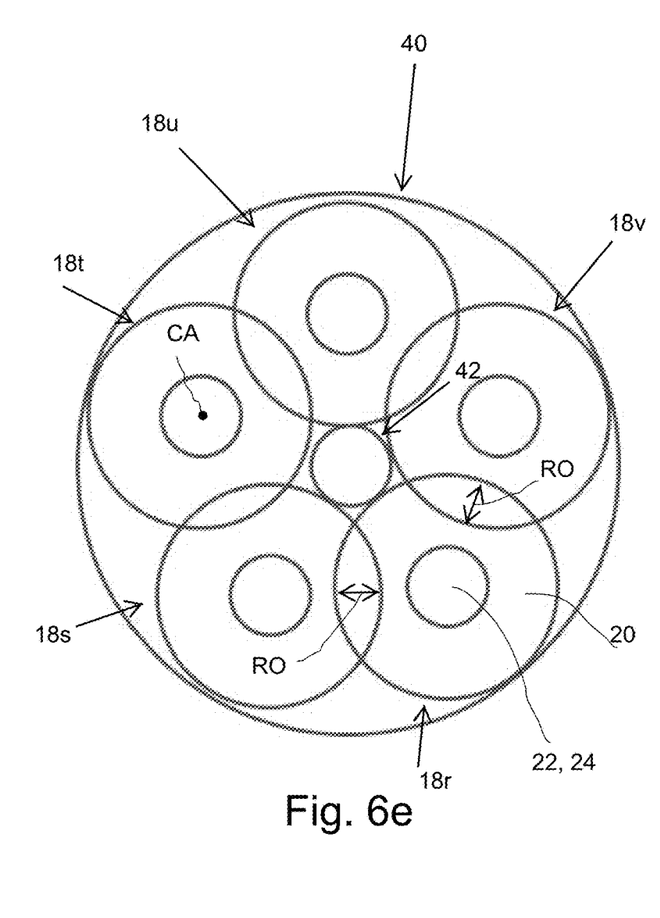

Like the detectors discussed above with respect to FIG. 4, detectors 118a to 118e are arranged such that first sections 20 include outer circumferential surfaces that extend radially past the outer circumferential surfaces of the first sections 20 of or more of the directly adjacent detectors, and as discussed with respect to FIGS. 6d, 6e, thus radially overlap each other. For example, as shown in FIG. 6a, the outer circumferential surface of section 20 of detector 118c extends radially past the outer circumferential surfaces of the first sections 20 of directly adjacent detectors 118b and 118d. As can be understood by viewing FIGS. 6a and 6b together, the outer circumferential surface of section 20 of detector 118c may also extend radially past the outer circumferential surfaces of the first sections 20 of detectors 118a and 118e due to the compact non-linear bundled arrangement of detectors 118a to 118e, for an extremely compact arrangement.

Due to sections 20 of the detectors 118a to 118e being axially offset from each other, each of detectors 118b to 118e of FIGS. 6a to 6c includes a section 20 that is in radial alignment with one or more sections 22, with detector 118a including a section 20 that is axially offset further than ends 146 of detectors 118b to 118e. Section 20 of detector 118e is in radial alignment with sections 22 of all of the other detectors 118a to 118d. Section 20 of detector 118d is in radial alignment with sections 22 of detectors 118c to 118a. Section 20 of detector 118c is in radial alignment with sections 22 of detectors 118a, 118b. Section 20 of detector 118b is in radial alignment with section 22 of detector 118a.

FIGS. 6d and 6e schematically show axial views that illustrate the radial overlap of detector material sections 20 of detectors 18. As should be understood in view of FIG. 6a, these detectors would not be in the same plane, but are merely illustrated as such for explanatory purposes. In the embodiment shown in FIG. 6d, the arrangement includes five flux detectors 18 denoted as detectors 18m to 18q and a background detector 42 inside of a housing 40. Detectors 18m to 18q are arranged in bundled arrangement, with center axes CA of detectors 18m to 18q defining vertices of a regular polygon, which is a pentagon in the embodiment shown in FIG. 6d, in a plane perpendicular to the center axes CA of detectors 18m to 18q. The section 20 of each detector 18m to 18q radially overlaps the section 20 of each of the two directly adjacent detectors 18*m* to 18*q*. For example, the section 20 of detector 18*m* radially overlaps the two directly adjacent detectors 18*n*, 18*q*, as illustrated by a radial overlap RO. By radial overlap, it is meant that when view in the axial direction, a radial extent of section 20 of detector 18*m* overlaps a radial extent of sections 20 of the adjacent detectors 18*n*, 18*q*. Background detector 42 is positioned radially outside of detectors 18*m* to 18*q*, radially between detectors 18*p*, 18*q* and housing 40.

In the embodiment shown in FIG. 6*e*, the arrangement includes five flux detectors 18 denoted as detectors 18*r* to 18*v* and a background detector 42 inside of a housing 40. Detectors 18*r* to 18*v* are arranged in bundled arrangement, with center axes CA of detectors 18*r* to 18*v* defining vertices of a regular polygon, which is a pentagon in the embodiment shown in FIG. 6*e*, in a plane perpendicular to the center axes CA of detectors 18*r* to 18*v*. The section 20 of each detector 18*r* to 18*v* radially overlaps the section 20 of each of the two directly adjacent detectors 18*r* to 18*v*. For example, the section 20 of detector 18*r* radially overlaps the two directly adjacent detectors 18*s*, 18*v*, as illustrated by a radial overlap RO. By radial overlap, it is meant that when view in the axial direction, a radial extent of section 20 of detector 18*r* overlaps a radial extent of sections 20 of the adjacent detectors 18*s*, 18*v*. Background detector 42 is positioned radially inside of detectors 18*r* to 18*v*.

Figure 7:
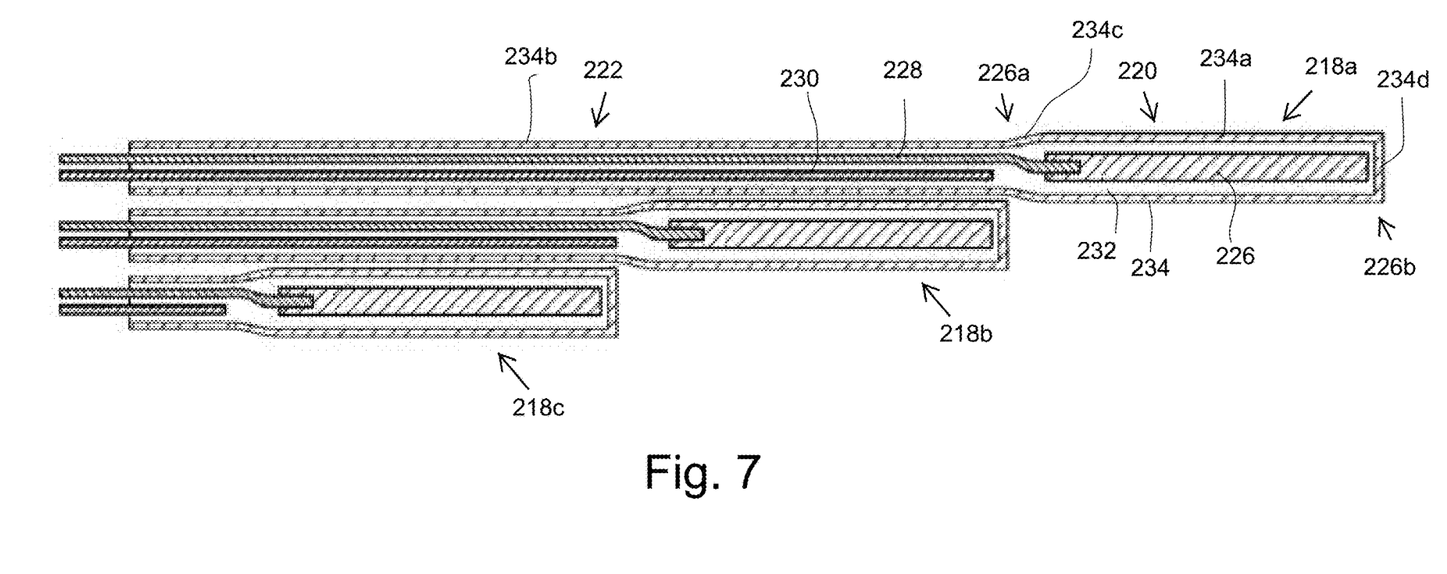
FIG. 7 schematically shows a self-powered in-core detector arrangement in accordance with another embodiment of the present invention including detectors with background wires included therein.

FIG. 7 schematically show a self-powered in-core detector arrangement in accordance with another embodiment of the present invention, which provides a similar arrangement as in FIGS. 6*a* to 6*c*, except that the background detectors are included in the self-powered detectors 218. The arrangement in FIG. 7 includes three detectors 218 denoted as detectors 218*a*, 218*b*, 218*c*, with each detector 218 including only two sections 220, 222 arranged with sections 220 axially offset from each other such that detectors 218 are nestled together in a compact arrangement. FIG. 7 shows detectors 218*a* to 218*c* arranged in a linear arrangement so each detectors 218*a* to 218*c* is viewed clearly; however, detectors 218*a* to 218*c* may be arranged in non-linear bundled arrangement inside a housing as similarly discussed above.

Detectors 218*a* to 218*c*, similar to detectors 18 shown in FIG. 2, each includes a contiguous section of a flux detecting material 226, a lead wire 228 extending from a first axial end 226*a* of detector material 226 and a background detector is the form of a background wire 230 extending from first axial end 226*a*. A first axial end of lead wire 228 is embedded in first axial end 226*a* of detector material 226. Detector material 226 and portions of wires 228, 230 are directly surrounded by an insulator 232 in the radial direction. Insulator 232 is directly surrounded by a sheath 234 in the radial direction and in the axial direction at a second axial end 226*b* of detector material 226.

Detector material 226 is provided solely in first section 220, while a majority of wires 228, 230 are provided in second section 222. Insulator 232 and sheath 234 extend through both sections 220, 222, with sheath 234 defining outer circumferential surfaces of sections 220, 222. An outer circumferential surface of sheath 234 has larger outer diameter at first section 220, than at second section 222 in the same manner as described above with respect to the detectors 18 in FIG. 2. More specifically, sheath 234 includes a first sheath section 234*a* that is cylindrical and defines the outer circumferential surface of first section 220 and a second sheath section 234*b* that is cylindrical and defines the outer circumferential surface of second section. Sheath 234 also includes a tapered section 234*c* extending radially outward while extending axially from second section 234*b* to first section 234*a*. Sheath 234 further includes an end section 234*d*, which forms the closed end of sheath 234 axially abutting the portion of insulator 232 that contacts second end 226*b* of detector material 226. As similarly shown in FIG. 1, an oversheath around detectors 218 extends far outside the reactor core 14 to connector 27, and wires 228, 230 extend out of sheath 234 inside the oversheath just before lead wire 228 reaches connector 27

Like the detectors discussed above with respect to FIG. 4, detectors 218*a* to 218*c* are arranged such that first sections 220 include outer circumferential surfaces that extend radially past the outer circumferential surfaces of the first sections 220 of one or more of the directly adjacent detectors. Due to sections 220 of the detectors 218*a* to 218*c* being axially offset from each other, section 220 of detector 218*b* is in radial alignment with section 220 of detector 218*a* and section 220 of detector 218*c* is in radial aligned with sections of detectors 218*a*, 218*b*.

Figure 8:
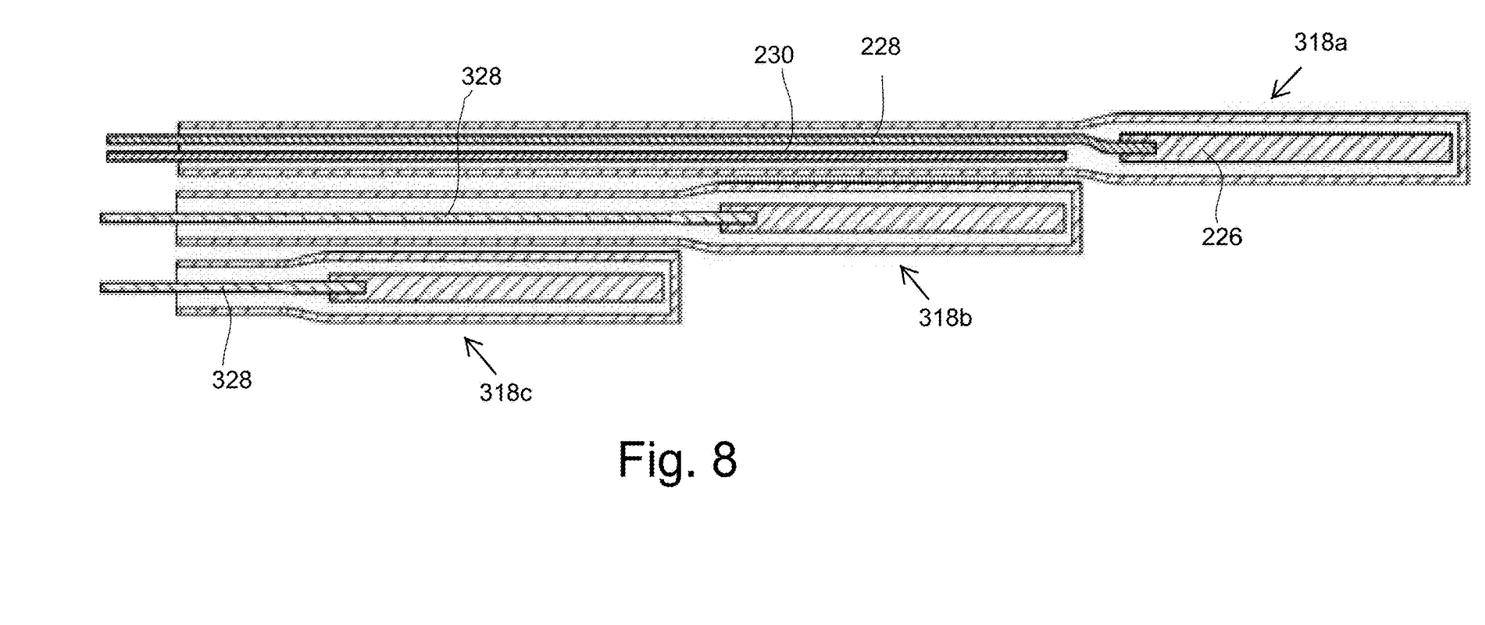
FIG. 8 schematically shows a self-powered in-core detector arrangement in accordance with another embodiment of the present invention including detectors with a background wire included in only one of the detectors.

FIG. 8 schematically show a self-powered in-core detector arrangement in accordance with another embodiment of the present invention, which is configured in the same manner as the self-powered in-core detector in FIG. 7, except that a background detectors 230 is only included in one of the self-powered detectors 218. The arrangement in FIG. 8 includes three detectors 318 denoted as detectors 318*a*, 318*b*, 318*c*, with detector 318*a* including a lead wire 228 and a background wire 230, and detectors 318*b*, 318*c* including lead wires 328, but not background wires. The background wire 230 is included in the detector with the longest lead wire to provide a background signal that can be used for each of detectors 318*a*, 318*b*, 318*c*.

Figure 9:
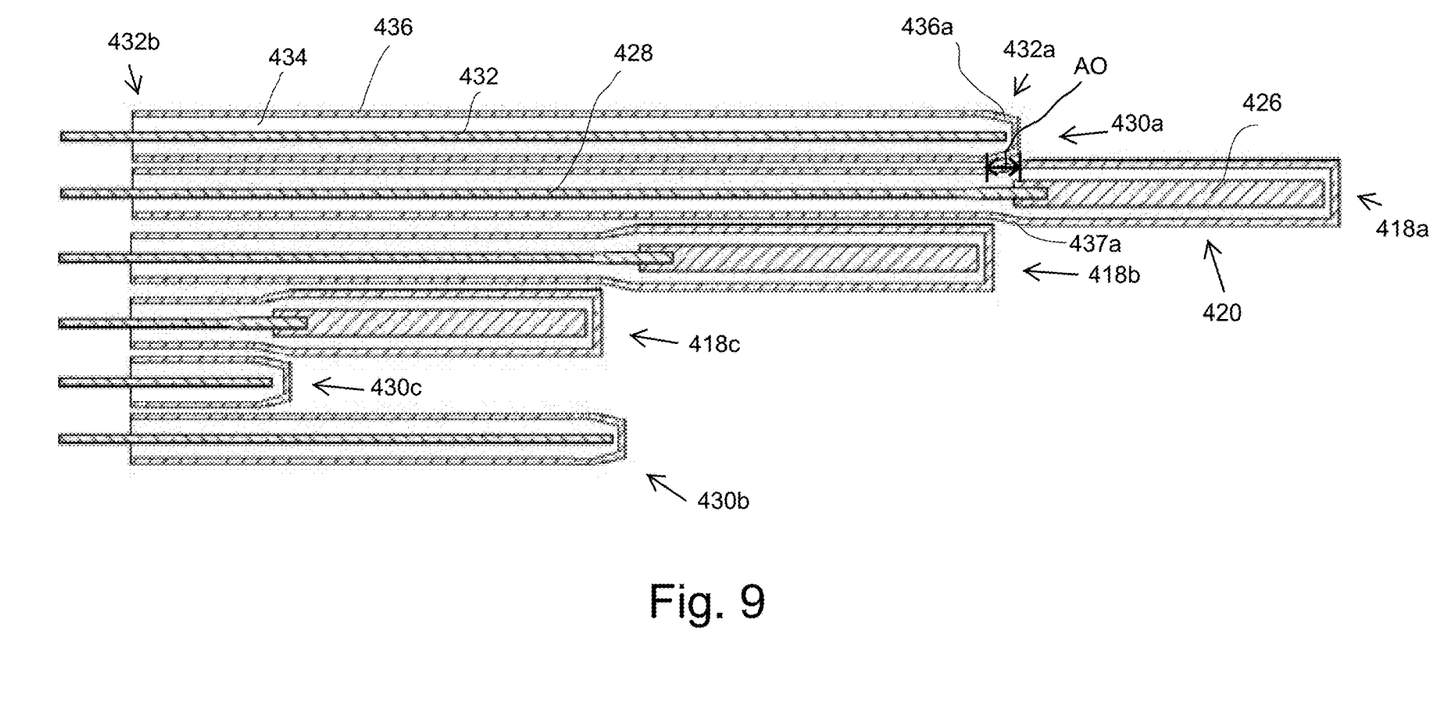
FIG. 9 schematically shows a self-powered in-core detector arrangement in accordance with another embodiment of the present invention including detectors with lead sections and a background detector for each detector.

FIG. 9 schematically show a self-powered in-core detector arrangement in accordance with another embodiment of the present invention, which is configured in a similar manner as the self-powered in-core detector in FIG. 8, except that background detectors 430*a*, 430*b*, 430*c* are provided for each of the self-powered detectors 418*a*, 418*b*, 418*c* outside of detectors 418*a*, 418*b*, 418*c*. Each of the background detectors includes a respective background wire 432 that is the same length as the length of the corresponding lead wire 428 extending outside of detector material 426. Each background detector 418*a*, 418*b*, 418*c* includes a background wire 432 a majority thereof which is directly surrounded by an insulator 434 in the radial direction. Insulator 434 also surrounds a first axial end 432*a* of background wire 432 in the axial direction. Insulator 434 is directly surrounded by a sheath 436 in the radial direction and in the axial direction at the first axial end 432*a* of background wire 432. A second axial end 432*b* of background wire 432 extends axially outside of insulator 434 and sheath 436. Sheath 436 may be tapered at the first axial end 432*a* such that a tapered section 436*a* of sheath 436 at least partially axially overlaps and radially overlaps the tapered section 437*a* of the sheath of the respective detector 418*a*, 418*b*, 418*c* for arrangement of background detectors 430*a*, 430*b*, 430*c* in a compact arrangement with detectors 418*a*, 418*b*, 418*c*. An axial overlap AO is shown in FIG. 9 for tapered section 436*a* of background detector 430*a* and tapered section 437*a* of self-powered detector 418*a*. Detectors 430*a*, 430*b*, 430*c* and detectors 418*a*, 418*b*, 418*c* are arranged such that first sections 420 of detectors 418*a*, 418*b*, 418*c* include outer circumferential surfaces that extend radially past the outer circumferential surfaces of the first sections 420 of one or more of the directly adjacent detectors 418a, 418b, 418c and also the outer circumferential surfaces of the directly adjacent background detectors 430a, 430b, 430c.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A self-powered in-core detector arrangement for measuring flux in a nuclear reactor core comprising:
   a first in-core detector comprising:
      a first flux detecting material;
      a first lead wire extending longitudinally from a first axial end of the first flux detecting material;
      a first insulating material surrounding outer diameters of the first flux detecting material and the first lead wire; and
      a first sheath surrounding the first insulating material, the first sheath including a first section surrounding the first flux detecting material and a second section surrounding the first lead wire, the first section of the first sheath having a greater outer diameter than the second section of the first sheath; and
   a second in-core detector comprising:
      a second flux detecting material;
      a second lead wire extending longitudinally from a first axial end of the second flux detecting material;
      a second insulating material surrounding outer diameters of the second flux detecting material and the second lead wire; and
      a second sheath surrounding the second insulating material, the second sheath including a first section surrounding the second flux detecting material and a second section surrounding the second lead wire, the first section of the second sheath having a greater outer diameter than the second section of the second sheath,
   the first section of the first sheath being axially offset from the first section of the second sheath and radially aligned with the second section of the second sheath.

2. The arrangement as recited in claim 1 wherein the first in-core detector includes a first tail wire extending longitudinally from a second axial end of the first flux detecting material, the first sheath including a third section surrounding the first tail wire, the first section of the first sheath having a greater outer diameter than the third section of the first sheath, the first section of the second sheath being radially aligned with the third section of the first sheath.

3. The arrangement as recited in claim 2 further comprising a third in-core detector comprising:
   a third flux detecting material;
   a third lead wire extending longitudinally from a first axial end of the third flux detecting material;
   a third insulating material surrounding outer diameters of the third flux detecting material and the third lead wire; and
   a third sheath surrounding the third insulating material, the third sheath including a first section surrounding the third flux detecting material and a second section surrounding the third lead wire, the first section of the third sheath having a greater outer diameter than the second section of the third sheath,
   the first section of the third sheath being axially offset from the first section of the first sheath and the first section of the second sheath, the first section of the third sheath being radially aligned with the third section of the first sheath.

4. The arrangement as recited in claim 3 wherein the second in-core detector includes a second tail wire extending longitudinally from a second axial end of the second flux detecting material, the second sheath including a third section surrounding the second tail wire, the first section of the third sheath being radially aligned with the third section of the second sheath.

5. The arrangement as recited in claim 2 wherein the first sheath includes a first tapered section connecting the first section and the second section of the first sheath and a second tapered section connecting the first section and the third section of the first sheath.

6. The arrangement as recited in claim 5 wherein the second sheath includes a first tapered section connecting the first section and the second section of the second sheath, a portion of the second tapered section of the first sheath being directly axially aligned with a portion of the first tapered section of the second sheath.

7. The arrangement as recited in claim 1 wherein an outer circumferential surface of the first section of the first sheath extends radially past an outer circumferential surface of the first section of the second sheath.

8. The arrangement as recited in claim 7 wherein the outer circumferential surface of the first section of the first sheath is radially offset from an outer circumferential surface of the second section of the first sheath by a distance that is greater than a distance that the outer circumferential surface of the first section of the second sheath is radially offset from the outer circumferential surface of the second section of the first sheath.

9. The arrangement as recited in claim 1 wherein an outer circumferential surface of the first section of the first sheath directly radially faces an outer circumferential surface of the second section of the second sheath.

10. The arrangement as recited in claim 1 further comprising a background detector distinct from the first and second in-core detectors.

11. The arrangement as recited in claim 1 wherein the first in-core detector includes a background wire within the first insulating material.

12. The arrangement as recited in claim 1 wherein the first in-core detector does not include a tail wire.

* * * * *